US012012137B2

(12) United States Patent
Fox et al.

(10) Patent No.: US 12,012,137 B2
(45) Date of Patent: Jun. 18, 2024

(54) RAILROAD CROSSING GATE LIGHT OUT DETECTOR APPARATUS AND METHOD

(71) Applicant: Railway Equipment Company, Inc., Plymouth, MN (US)

(72) Inventors: David K. Fox, Wayzata, MN (US); Randall G. Honeck, Plymouth, MN (US)

(73) Assignee: Railway Equipment Company, Inc., Plymouth, MN (US)

( * ) Notice: Subject to any disclaimer, the term of this patent is extended or adjusted under 35 U.S.C. 154(b) by 685 days.

(21) Appl. No.: 17/018,383

(22) Filed: Sep. 11, 2020

(65) Prior Publication Data
US 2021/0086811 A1    Mar. 25, 2021

Related U.S. Application Data

(60) Provisional application No. 62/905,067, filed on Sep. 24, 2019.

(51) Int. Cl.
*B61L 29/30* (2006.01)
*B61L 29/18* (2006.01)
*G01J 1/44* (2006.01)
*G08C 17/02* (2006.01)

(52) U.S. Cl.
CPC .............. *B61L 29/30* (2013.01); *G01J 1/44* (2013.01); *B61L 29/18* (2013.01); *B61L 2205/00* (2013.01); *B61L 2207/00* (2013.01); *G08C 17/02* (2013.01)

(58) Field of Classification Search
CPC .. G01J 1/44; B61L 29/18; B61L 29/30; B61L 2205/00; B61L 2207/00
See application file for complete search history.

(56) References Cited

U.S. PATENT DOCUMENTS

| 494,390 A | 3/1893 | Smith |
| 516,049 A | 3/1894 | Harden |
| 545,701 A | 9/1895 | Lattig |
| 752,959 A | 2/1904 | Currier |
| 913,974 A | 3/1909 | Pettey |

(Continued)

FOREIGN PATENT DOCUMENTS

| DE | 2451743 A1 | 5/1976 |
| FR | 715690 A | 12/1931 |

(Continued)

*Primary Examiner* — Thanh Luu
(74) *Attorney, Agent, or Firm* — Merchant & Gould P.C.

(57) ABSTRACT

A railroad crossing light detector system is disclosed. The system includes determining a first signal indicative of the amount of light emitted from an illuminated railroad crossing light source and determining a second signal indicative of the orientation of the crossing light. The first and second signals are transmitted to a signal determination module that compares the first and second signals to predetermined stored values. The compared signals are then provided to a railroad crossing controller for relaying to a central/remote monitoring location. In the event that at least one of the signals is out of range relative to the stored value, then an inspection request signal together with information on the location of the crossing light is provided to the central monitoring location. In this manner, the number of in-person inspections to the crossing light may be significantly reduced.

12 Claims, 5 Drawing Sheets

(56) References Cited

U.S. PATENT DOCUMENTS

| | | | |
|---|---|---|---|
| 1,211,676 A | 1/1917 | Coleman |
| 1,818,625 A | 8/1931 | Hunter |
| 2,386,161 A | 10/1945 | Hawes |
| 2,598,196 A | 5/1952 | Staley |
| 2,792,559 A | 5/1957 | Maberry |
| 3,036,146 A | 5/1962 | Kamen |
| 3,251,069 A | 5/1966 | Clark |
| 3,538,484 A | 11/1970 | Passafiume |
| 3,964,704 A | 6/1976 | Karr |
| 3,994,457 A | 11/1976 | Teasel |
| 4,053,760 A | 10/1977 | Glazier |
| 4,067,523 A | 1/1978 | Kenny |
| 4,068,966 A | 1/1978 | Johnson |
| 4,186,429 A | 1/1980 | Johnston |
| 4,449,168 A | 5/1984 | Ewing |
| 4,460,811 A | 7/1984 | Murr |
| 4,523,256 A | 6/1985 | Small |
| 4,666,108 A | 5/1987 | Fox |
| 4,784,356 A | 11/1988 | Fox |
| 7,075,427 B1 | 7/2006 | Pace |
| 9,272,721 B2 | 3/2016 | Bohme |
| 9,701,328 B2 | 7/2017 | Martin |
| 2005/0237215 A1* | 10/2005 | Hatfield | B61L 5/1881 |
| | | | 340/686.2 |
| 2005/0284987 A1 | 12/2005 | Kande |
| 2006/0001547 A1* | 1/2006 | Davenport | G08G 1/095 |
| | | | 246/473 R |
| 2009/0007661 A1 | 1/2009 | Nasiri |
| 2009/0194642 A1 | 8/2009 | Honeck |
| 2012/0326508 A1* | 12/2012 | Roberts | H05B 45/48 |
| | | | 307/36 |
| 2014/0028289 A1 | 1/2014 | Ohnemus |
| 2016/0171844 A1* | 6/2016 | Zwirn | G08B 25/08 |
| | | | 340/506 |
| 2018/0202636 A1 | 7/2018 | Fox |

FOREIGN PATENT DOCUMENTS

| | | |
|---|---|---|
| FR | 993578 A | 11/1951 |
| GB | 324007 A | 1/1930 |
| GB | 701030 A | 12/1953 |
| GB | 1480992 A | 10/1975 |

\* cited by examiner

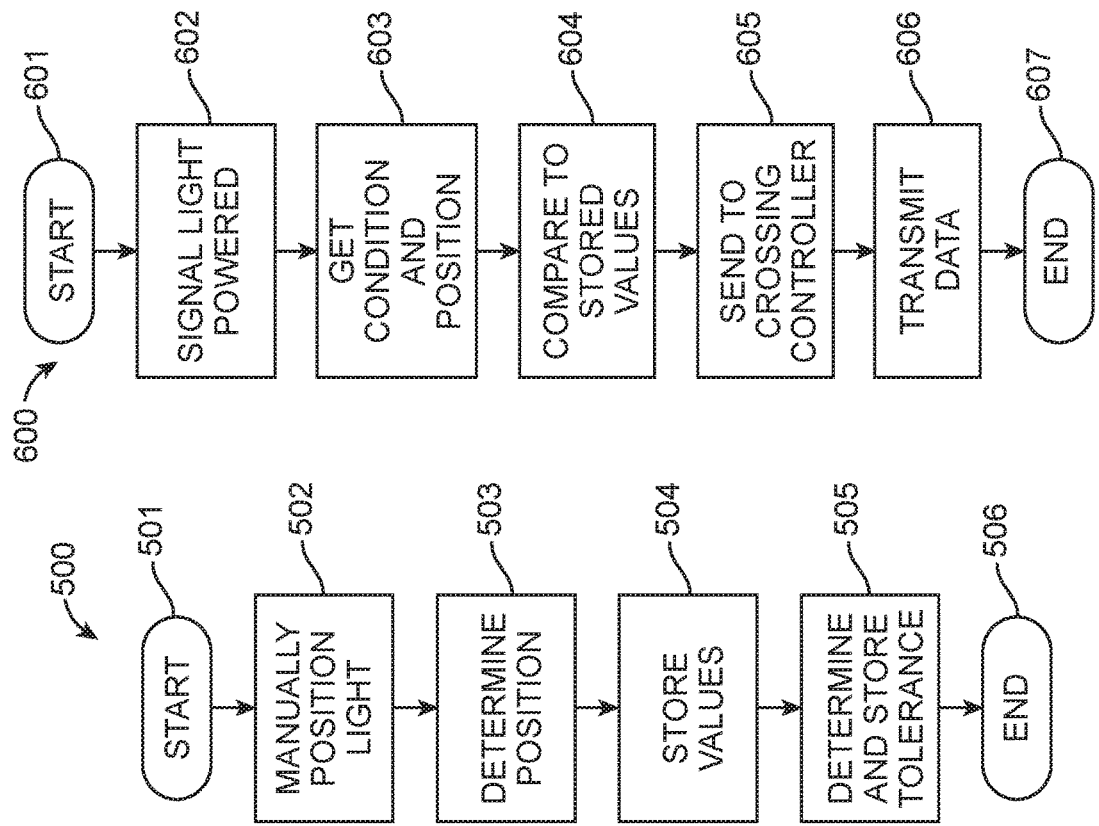
FIG. 6
FIG. 5
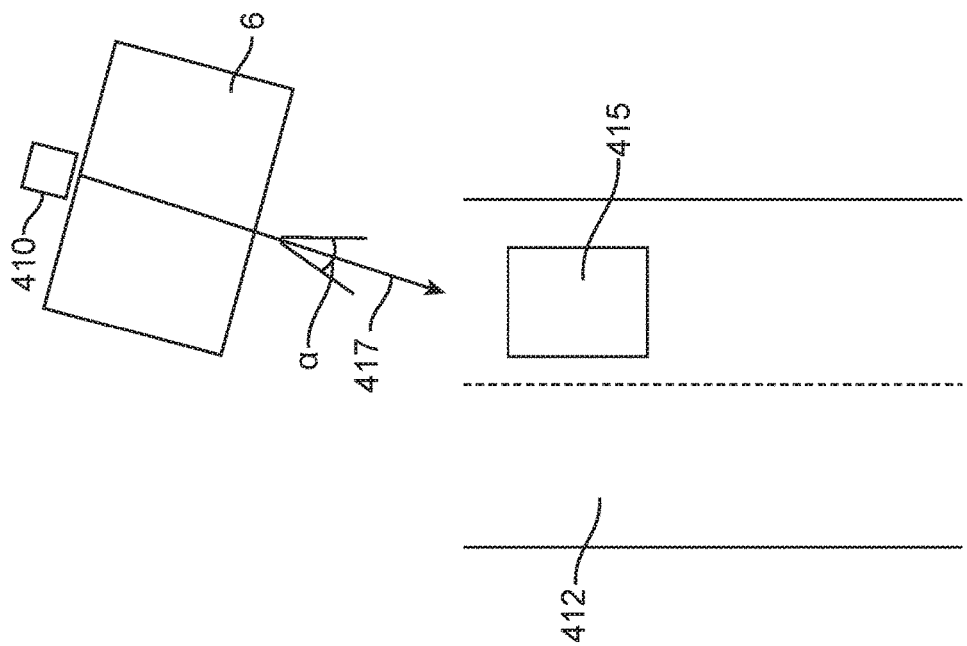
FIG. 4

RAILROAD CROSSING GATE LIGHT OUT DETECTOR APPARATUS AND METHOD

FIELD OF THE INVENTION

The present disclosure provides a method and apparatus for detecting whether the light in a railroad crossing signal is energized and working appropriately; detecting whether the light is oriented in an acceptable manner; and transmitting the detected information to a system for monitoring and/or controlling the railroad crossing signal.

BACKGROUND

Railroad crossing lights and gates are installed at many intersections between railroad tracks and roads to alert vehicular traffic and pedestrians when a train approaches the intersection. Typically, the crossing lights include two red lights that alternately flash. In addition, a crossing gate or arm may be included at the crossing. As is well known, as the train approaches the crossing, the warning lights are alternately flashed and the crossing arm is swung from a normally upright to a lowered, horizontal position. The warning lights continue to flash and the gate remains lowered until the train has completed traversing the crossing.

Maintenance of the crossing equipment, such as the alignment of the crossing lights and their operation, requires periodic inspection of the equipment. Further, applicable U.S. Federal Regulations require inspections to insure compliance with the number of flashes of the lights per minute and alignment of the lights, among other requirements (see e.g., 49 CFR Section 234.217). Verification of the operation and alignment of the crossing lights is often accomplished by a rail worker with a visual inspection performed in-person and on-foot. However, such inspections are labor intensive and inefficient.

Therefore, there arises a need for a method and apparatus that is capable of automatically monitoring and reporting on the condition of crossing lights at railroad intersections without requiring an in-person visit to each crossing light.

SUMMARY

The present invention generally relates to automatically monitoring the status of a light source for operability and orientation, more particularly relates to determining that the light source illuminates appropriately and is aligned in an acceptable direction, and even more particularly compares the determined illumination and alignment of the light source to stored values and, when appropriate, provides an inspection required signal to a broader system monitoring location remote from the light source. A preferred environment in which the present invention may be employed is a railroad crossing light. However, it will be appreciated that other traffic lights having a desired or required directional component may also utilize the principles of the present invention.

In one embodiment constructed according to the principles of the present invention, there is provided a railroad crossing light monitoring system. The railroad crossing light is typically located within a housing and is alternately energized (e.g., with a second crossing light) when a train approaches the crossing. The housing includes an aperture with a lens located therein. When the light source is activated, the light passes through the lens in order to alert the vehicular and/or pedestrian traffic (referred to collectively as "traffic") of the approaching train.

The light source is generally fixed within the housing. Accordingly, to align the light emitted by the light source, the housing is mounted to a railroad crossing mast in a manner that facilitates adjusting the housing in three-dimensional space. Adjustment of the housing thereby aligns the light appropriately toward the traffic (e.g., in a predetermined manner relative to the road). An alignment aperture, which may be referred to as a peep sight, is fixedly attached to the housing. The alignment aperture is used to initially aid in the adjustment of the housing.

The signal generation module of the light monitoring system includes a photodetector located proximate the light source. The photodetector is arranged and configured to provide a first signal indicative that the light source is operable and has illuminated. A housing position sensor is also included. The housing position sensor is arranged and configured to provide a second signal indicative of the orientation of the housing (and thereby the light source). The signal generation module further includes a transmitter that receives the first and second signals and transmits the first and second signals to a signal determination module.

The signal determination module of the light monitoring system includes a receiver, a central processing unit ("CPU"), and a memory. The memory stores acceptable reference data relating to the first and second signals. The CPU is arranged and configured to compare the received first and second signals against the stored acceptable reference data. The signal determination module preferably stores the compared data in memory and transmits the results of the comparison to a control system for the railroad crossing. In the event that the comparison results in a value outside of the acceptable range, then an inspection needed signal is generated and transmitted to a remote system monitoring location.

In another embodiment, a method is provided that includes determining a first signal indicative of the amount of light emitted from an illuminated railroad crossing light source and determining a second signal indicative of the orientation of the crossing light. The first and second signals are transmitted to a signal determination module that compares the first and second signals to predetermined stored values. The compared signals are then provided to a railroad crossing controller for relaying to a central/remote monitoring location. In the event that at least one of the signals is out of range relative to the stored value, then an inspection request signal together with information on the location of the crossing light is provided to the central monitoring location. In this manner, the number of in-person inspections to the crossing light may be significantly reduced.

Therefore, according to one aspect of the invention, there is provided a railroad crossing light monitoring system, the railroad crossing light of the type that is located within a housing, is energized when a train approaches the crossing and is directionally oriented toward traffic approaching the crossing, the system comprising: a photodetector located proximate the light, the photodetector arranged and configured to provide a first signal indicative of the output of the light; a position sensor, the position sensor arranged and configured to provide a second signal indicative of the orientation of the light and housing; and a transmitter that receives the first and second signals and transmits the first and second signals for comparison to predetermined reference values.

According to another aspect of the invention, there is provided a railroad crossing light monitoring system, the railroad crossing light of the type that is located within a housing, is energized when a train approaches the crossing and is oriented in a predetermined manner relative to traffic approaching the crossing, the system comprising: a signal generation module, the signal generation module including a photodetector to provide a first signal indicating the operational status of the crossing light, a position sensor to provide a second signal indicative of the orientation of the crossing light and housing, and a transmitter operably connected to the photodetector and position sensor; and a signal determination module that receives the first and second signals from the transmitter and compares the received first and second signals to stored reference values, wherein when the received first and second signals do not match the stored reference values, a signal is sent to a remote monitoring location to initiate a maintenance inspection of the crossing light.

According to yet another aspect of the invention, there is provided a method for monitoring the operability and positioning of a railroad crossing light, comprising: generating a first signal indicative of the amount of light emitted from a light source when in operation; generating a second signal indicative of the orientation of the light source; transmitting the first and second signals to a signal determination module; comparing the first and second signals to predetermined stored values by the signal determination module; and transmitting a signal to a remote monitoring site if the first and second signals are outside of a predetermined range from the stored values, whereby a maintenance inspection of the crossing light can be initiated.

While the invention will be described with respect to preferred embodiment configurations, methods and specifications, it will be understood that the invention is not to be construed as limited in any manner by either such configuration, methods and/or specifications described herein. Further, while a preferred environment is in connection with a railroad crossing light, the invention may be employed in other environments in which the illumination and orientation of a light is desired or required. These and other variations of the inventions will become apparent to those skilled in the art upon a more detailed description of the inventions.

The advantages and features which characterize the inventions are pointed out with particularity in the claims annexed hereto and forming a part hereof. For a better understanding of the inventions, however, reference should be had to the drawings which form a part hereof and to the accompanying descriptive matter, in which there is illustrated and described preferred embodiments of the inventions.

BRIEF DESCRIPTION OF THE DRAWINGS

Referring to the drawings, wherein like numerals represent like parts throughout the several views:

FIG. 4 is a schematic illustration of the alignment of the crossing light using an alignment aperture.

FIG. 5 is a representative block diagram of the method which may employed to initially align the crossing light and store reference values in the memory of the signal determination module.

FIG. 6 is a representative block diagram of the method which may be employed by the crossing light monitoring system in operation.

DETAILED DESCRIPTION

As noted above, the present invention generally relates to automatically monitoring the status of a light source for operability and orientation, more particularly relates to determining that the light source illuminates appropriately and is aligned in an acceptable direction, and even more particularly compares the determined illumination and alignment of the light source to stored values and, when appropriate, provides an inspection required signal to a system monitoring location remote from the light source and/or the crossing. A preferred environment in which the present invention may be employed is a railroad crossing light. However, it will be appreciated that other traffic lights having a desired or required directional component may also utilize the principles of the present invention.

Figure 1:
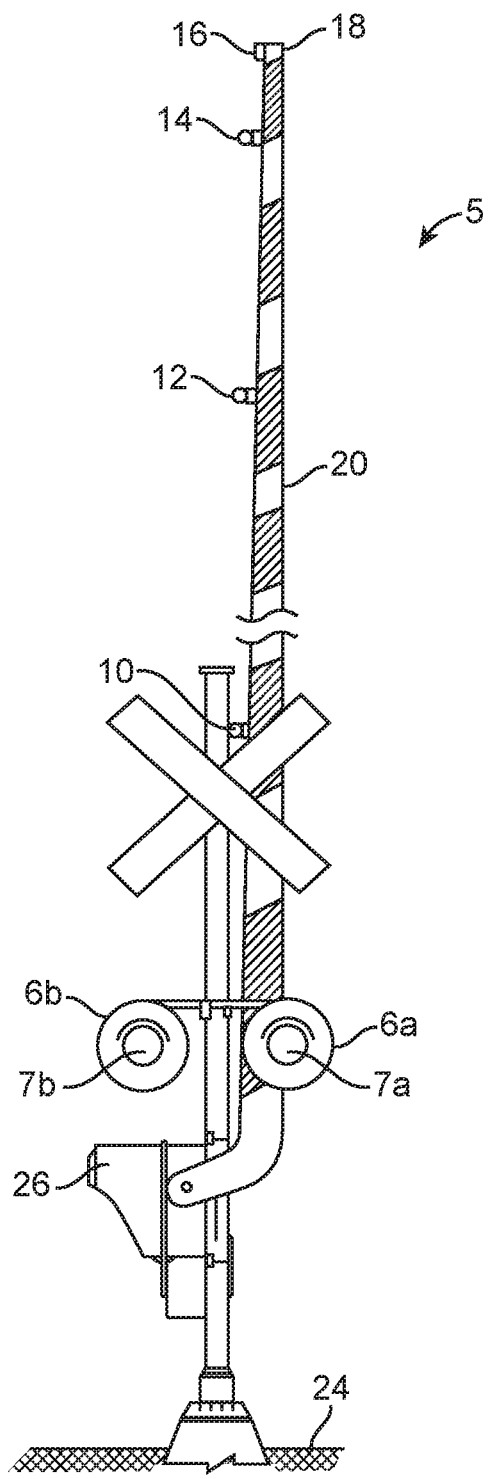
FIG. 1 is a representative illustration of a flashing light crossing signal.

As noted in the previous paragraph, a railroad crossing light environment is an embodiment in which the principles of the invention may be employed. Thus, a representative railroad crossing gate and arm device will be briefly next described. Crossing device 5 is illustrated in FIG. 1 and includes housings 6a and 6b. Lenses 7a and 7b are mounted in the housings 6a and 6b, respectively, through which light from a light source (described further below) is visible. Arm 20, is movable from a normally upright position (as illustrated in FIG. 1) to a generally horizontal position relative to the ground 24 when in its warning position. Actuator 26 is the motive force used to move the arm 20 between the upright and horizontal positions. A plurality of additional warning lights are generally included on the arm 20 and are illustrated at 10, 12, 14, and 16. The distal end of arm 20 is identified at 18.

As is known to those of skill in the art, the crossing device 5 is activated as a train approaches the crossing. As part of the activation, light, visible through lenses 7a and 7b, is flashed in an alternating manner. Further, the arm 20 is lowered to a horizontal position relative to the ground. After the train has completed passing through the crossing, the arm 20 is raised and the flashing of the lights is discontinued. While the representative crossing device 5 is shown as including a crossing arm 20, many crossing devices do not include arm 20. Thus, crossing device 5 is shown only as one representative environment in which the present invention may be employed.

Figure 2:
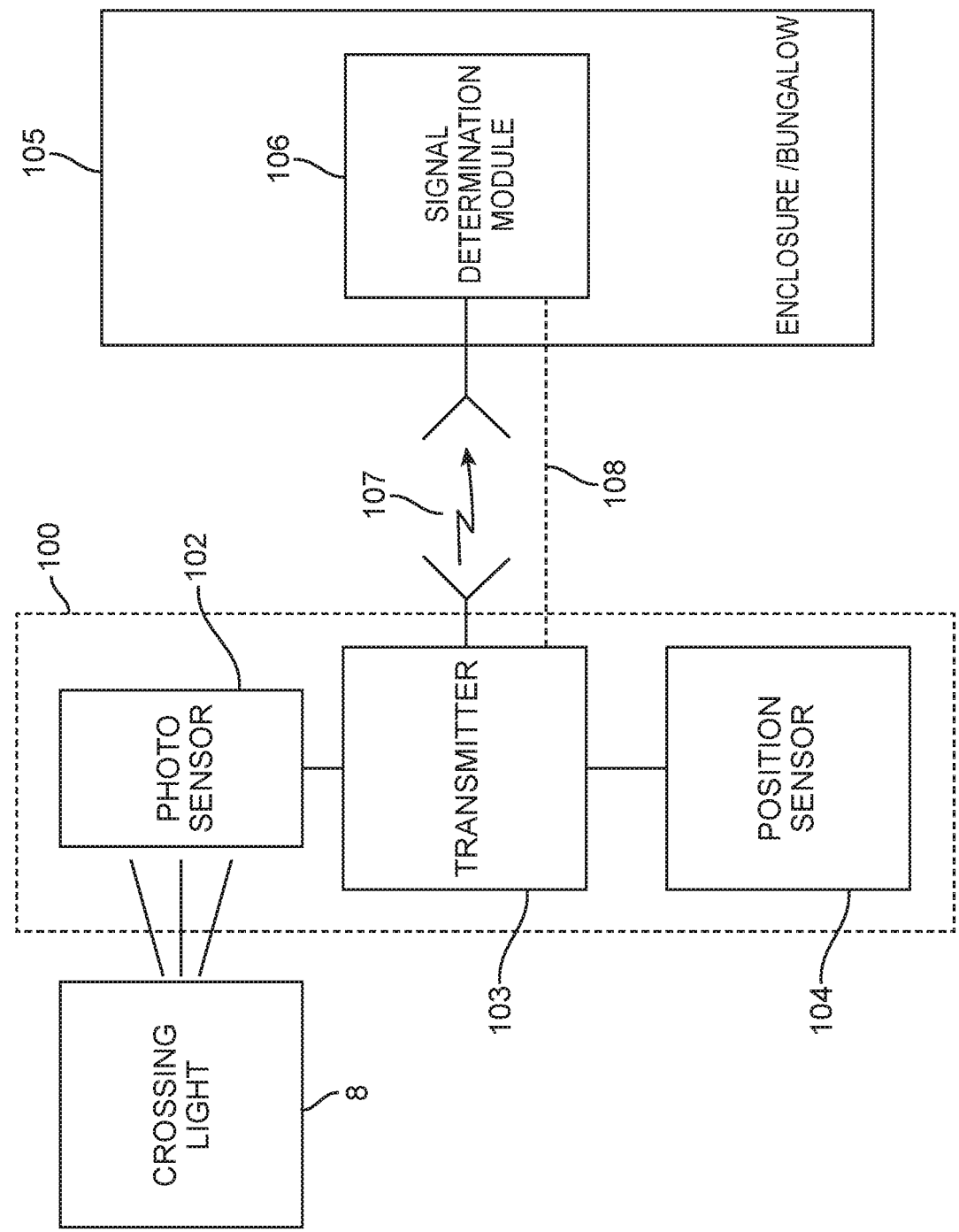
FIG. 2 is a functional block diagram including a signal generation module of a crossing light monitoring system.

Next referring to FIG. 2, light source 8 is illustrated. While only one light source 8 is illustrated in FIG. 2, it will be appreciated that there are generally two crossing lights arranged and configured to alternately flash mounted on crossing device 5. In addition, there may be a plurality of crossing devices 5 at each crossing location.

Crossing light detection and orientation signal generation module is shown generally at designation 100. The signal generation module 100 includes a photo sensor 102, a transmitter 103 and a position sensor 104. In one embodiment, each of the devices in signal generation module 100 are powered by very low voltage and so are able to tap their voltage requirements from the voltage provided to light source 8 when it is activated. However, in other embodiments a battery or a separate voltage source may be provided to power the components.

Photo sensor 102 generates a first signal representative of whether the light source 8 illuminates when it is activated. Position sensor 104 generates a second signal representative of the orientation of the housing 6 in which it is located when the light source 8 is activated. The positioning of the housings 6a and 6b is discussed below in connection with FIG. 4 with a single housing referred to for convenience by the designation "6" herein. Both the photo sensor 102 and position sensor 104 are connected to a transmitter 103.

The transmitter 103 receives first and second signals from the photo sensor 102 and the position sensor 104, respectively, when the light source 8 is actuated. As discussed above, the crossing light 8 is actuated when a train approaches the crossing. Accordingly, the photo sensor 102 is actuated upon each flash of the light source 8 and the transmitter 103 transmits an RF signal designated by 107 to signal determination module 106 located within an enclosure 105 located proximate the crossing. The enclosure 105 is often referred to as a "bungalow". Alternatively, the transmitter 103 may be hard wired to the signal determination module 106 control as shown in phantom at designation 108.

In one embodiment, the photosensor 102 is a semiconductor chip and the position sensor 104 is a 3 g sensor. For example, the position sensor 104 may be a 3-axis magnetic sensor.

Figure 3:
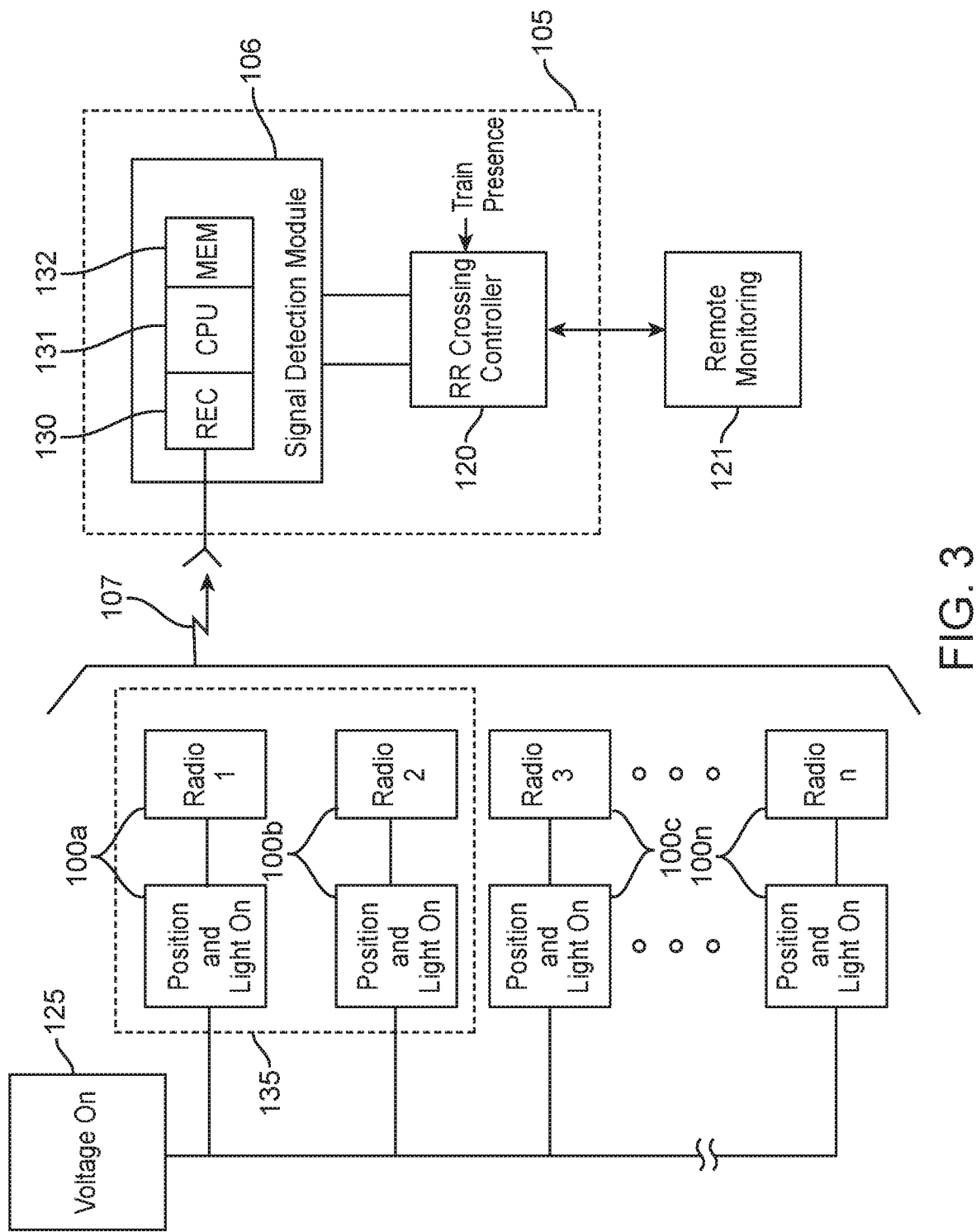
FIG. 3 is a functional block diagram illustrating a plurality of signal generating sensors in a crossing light monitoring system at a crossing and a signal determination module of a crossing light monitoring system.

FIG. 3 illustrates a schematic block diagram of a plurality of signal generation modules 100a through 100n. Since there are typically two light sources 8 mounted on each crossing device 5, the total number of signal generation modules located at a given crossing typically corresponds to the number of crossing devices 5 multiplied by two. When the voltage block 125 is activated, each signal generation module 100a-100n is activated and transmits the generated first and second signals at designation 107 to the signal determination module 106. It will be appreciated that the two signal generation modules 100a and 100b are mounted on the same crossing device 5 and are alternatingly energized as the corresponding light sources 8 are flashed. Accordingly, signal generation modules 100a and 100b are illustrated as a pair in phantom at 135. Further, each signal generation module pair mounted on a crossing device 5 will transmit signals to the signal determination module 106 in an interleaved fashion with one another.

The signal determination module 106 includes a receiver 130, a CPU 131 and memory 132. While not detailed, it will be appreciated that appropriate voltage sources and other attendant devices necessary to operate the components in their intended manner are also included. The receiver 130 is connected to the CPU 131, receives the signals 107 from the various transmitters which are part of signal generation module 100 (e.g., the generated first and second signals), and provides the data to the CPU 131. The signals 107 may include the raw first and second signals or may be transmitted in a predetermined format. However, each individual signal 107 from a signal generation module 100 also preferably includes identification information on the specific light source 8 and housing 7 to which the first and second generated signal corresponds. For example, GPS or an inventoried identifier might be used, among others.

A memory 132 is also connected to the CPU 131 and includes stored data on the desired or preferred values of the light emitted by the light source(s) 8 and housing 7 orientation coordinates. The stored data may be individual values with tolerances, acceptable ranges, and/or other predetermined reference value(s). In addition, the memory 132 may include or store geographical location information (e.g., GPS data) related to the crossing, time stamp data, data on individual crossing devices, etc. Still further, the data received in the transmissions 107 may be stored in a database in memory 132 or may be stored in a rolling database with a time stamp—such that an analysis of faults or out of tolerance conditions may be investigated relative to temporal events. The data may be subsequently provided to a railroad crossing controller 120 located in the enclosure 105 in a batch mode, only upon occurrence of a fault, or providing all determined data in real-time. The controller 120 also receives train presence input and so initiates the voltage-on power source condition at block 125. After receiving the data from the signal determination module 106, the data may be transmitted in an appropriate manner to a remote system monitoring location (or other positive train control device) 121. Determination of proper functioning may thereby be accomplished for a plurality of crossings from a single remote location—without numerous on-site visits.

Now referring to FIG. 4, the enclosures 6A, 6B of the crossing device 5 are shown in functional block form at 6 and include an alignment aperture 410. During the initial installation, a user sights through the aperture 410 along sight line 417 to align the housing 6 appropriately toward the road 412 (and traffic thereon) within an angle α. The angle is predetermined based on light passing through the lens 7 being visible to traffic (represented in FIG. 4 by car 415). The housing 6 is mounted on the crossing device 5 with a connector that can be adjusted in three-dimensional space and then securely fixed when the housing 6 is appropriately aligned.

Turning now to FIG. 5, an example of the logical steps 500 which may be used in connection with aligning the housing 6, establishing the coordinates for comparison with the received second signal position data, and storing the information in memory 132 are illustrated. The process starts generally at 501 and continues to block 502 where the housing 6 is manually positioned by a user in accordance with the above description in connection with FIG. 4. After fixing the position of the housing 6, the process moves to block 503. Here the position sensor 104 is initiated and the data is provided to CPU 131. The position data together with identifying information is stored in memory 132 at block 504. At block 505 the tolerance between subsequently received coordinates and the stored coordinates is determined and stored in memory 132. The process then ends at block 506.

FIG. 6 illustrates an embodiment of the process steps which may be taken in operation of the light monitoring system. The process is illustrated generally at 600 and begins at block 601. For convenience, the description will refer to a single light source 8 in a single housing 6. However, it will be appreciated that the light source 8 and housing 6 are part of a pair mounted on crossing device 5.

First, light source 8 is powered on at block 602 when a train approaches. For example, a train presence signal is generated and provided to crossing controller 120 from an approaching train (e.g., by shorting the tracks in a section proximate to the crossing in a well known manner). The light source 8 then flashes alternately and the light passes through aperture 7a to alert traffic.

At block 603, the photo sensor 102 is actuated by the illumination of the crossing light 8 and a first signal indicative of the amount of light emitted from the light source 8 the data is generated. In addition, a second signal indicative of the orientation of the housing/crossing light is generated by position sensor 104. The first and second signals are provided to transmitter 103 and are transmitted at 107 to receiver 130. The receiver 130 provides the signals to CPU 131.

At block 604, the CPU 131 compares the received first and second signals with the stored information in memory to determine if the received signals are within the stored ranges. For example, the first signal is compared against a known measured light output of the crossing light 8 and the second signal is compared against the coordinates stored during the housing 6 alignment process.

At block 605, the CPU 131 provides the outcome of the comparisons to the crossing controller 120 and at block 606 comparison data is transmitted to a remote monitoring location. The process ends at 607. In this manner, if the housing positioning has moved or if the lights are not properly illuminated, then a railway worker may be dispatched to visit the site to determine whether maintenance needs to be performed in connection with the crossing device 5. For example, the bulbs or LEDs of the crossing light may need to be replaced and/or the housing may need to be realigned toward traffic approaching the crossing so that the light is properly observed by the traffic.

Figure 7:
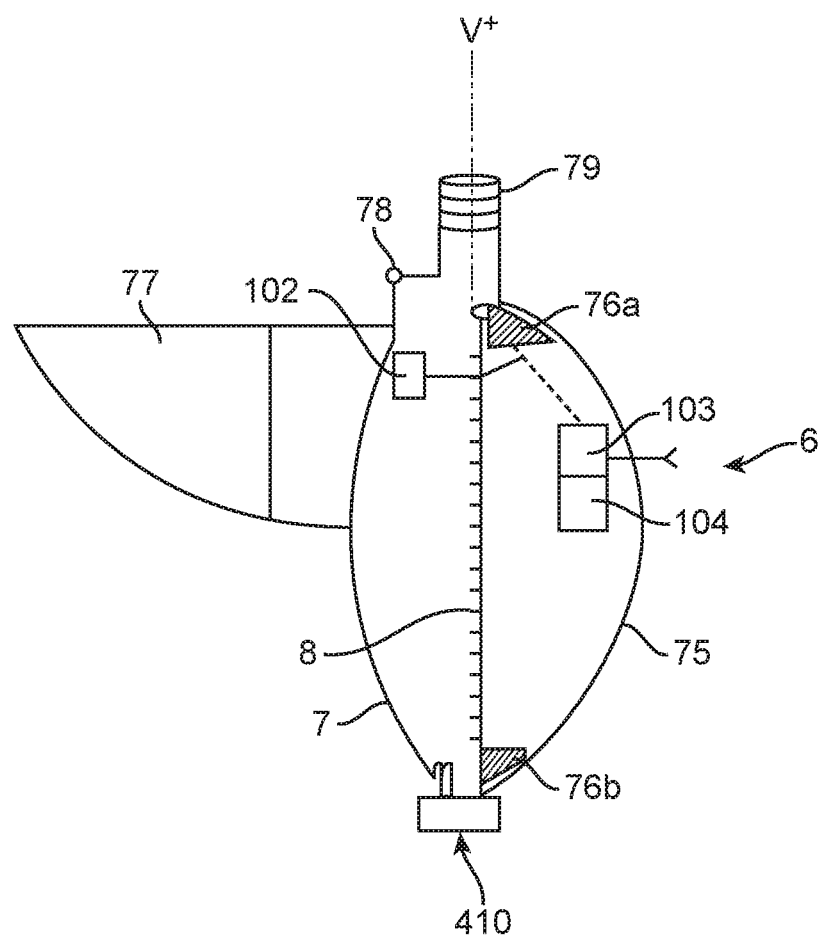
FIG. 7 is a schematic cross section diagram of a crossing light housing and components located therein.

FIG. 7 is a schematic cross section diagram of a crossing light housing 6 and components located therein. Housing 6 includes a back 75 and a front cover (including lens 7) which is hinged at 78. This allows the front cover to swing up for servicing of the components located within housing 6.

A lens hood 77 is provided to increase the ability of traffic to see the light through lens 7 during daylight hours. Mounting structure 79 and alignment aperture 410 are also located on housing 6.

A plurality of LED lights mounted on a suitable board are illustrated in FIG. 7 as the light source 8. However, it will be appreciated that any number of other types of light sources and bulbs might be used. The board is mounted on standoffs 76a and 76b which are in turn secured to the back 75. Photo sensor 102 is positioned in front of the LEDs thereby allowing it to receive illumination from the light source 8 when activated. The photo sensor 102 is connected to transmitter 103 and voltage source V+. Transmitter 103 and position sensor 104 are secured to the back 75 and appropriately connected to a voltage source V+.

It should be understood that even though numerous characteristics and advantages of the present invention have been set forth in the foregoing description, together with details of the structure and function of the invention, the disclosure is illustrative only and changes may be made in detail, especially in matters of the supporting hardware, components and devices, and to the full extent indicated by the broad general meaning of the terms in which the appended claims are expressed.

We claim:

1. A railroad crossing light monitoring system, the railroad crossing light of the type that is located within a housing, is energized when a train approaches the crossing and is directionally oriented toward traffic approaching the crossing, the system comprising:
   a) a photodetector located proximate the light, the photodetector arranged and configured to provide a first signal indicative of the output of the light;
   b) a position sensor, the position sensor arranged and configured to provide a second signal indicative of the orientation of the light and housing; and
   c) a transmitter that receives the first and second signals and transmits the first and second signals for comparison to predetermined reference values, wherein the photodetector, position sensor and transmitter are all located within the housing, wherein the housing includes a back housing portion and a front cover for covering a front of the back housing portion, wherein the front cover includes a lens, wherein the light includes a board that mounts within the housing, wherein the board has a front side and a back side, wherein LED lights are mounted at the front side of the board, wherein the position sensor and the transmitter are mounted within the back housing portion behind the back side of the board, wherein the photodetector is mounted in front of the board, and wherein the housing includes a peep sight for use in setting a desired orientation of the light and housing which is sensed by the position sensor and saved in memory as a reference orientation.

2. The railroad crossing light monitoring system of claim 1, wherein the transmitter transmits the first and second signals to a signal determination module, the signal determination module including a receiver, a central processing unit, and a memory.

3. The railroad crossing light monitoring system of claim 2, wherein the signal determination module includes a stored range of acceptable data for the first and second signals in the memory and the central processing unit is arranged and configured to compare the received first and second signals against the stored range of acceptable data.

4. The railroad crossing light monitoring system of claim 3, wherein the signal determination module transmits an inspection signal when the received first and second signals are outside the stored range of acceptable data.

5. The railroad crossing light monitoring system of claim 3, wherein the stored range of acceptable data is generated empirically by a user.

6. The railroad crossing light monitoring system of claim 3, wherein the results of the comparison are stored in a rolling database together with a time stamp, whereby analysis of temporal events relative to the compared results is enabled.

7. The railroad crossing light monitoring system of claim 2, wherein the transmitter transmits the first and second signals to the signal determination module using RF communication.

8. The railroad crossing light monitoring system of claim 1, wherein the photodetector and the position sensor are powered by a voltage source that powers the light.

9. The railroad crossing light monitoring system of claim 1, wherein the photodetector is a semiconductor chip and the position sensor is a 3-axis magnetic sensor.

10. The railroad crossing light monitoring system of claim 1, wherein the photodetector and the position sensor tap their voltage requirements from a voltage provided to the railroad crossing light.

11. A method for monitoring the operability and positioning of a railroad crossing light, comprising:
   a) generating a first signal indicative of the amount of light emitted from a light source when in operation;
   b) generating a second signal indicative of the orientation of the light source;
   c) transmitting the first and second signals to a signal determination module;
   d) comparing the first and second signals to predetermined stored values by the signal determination module;
   e) transmitting a signal to a remote monitoring site if the first and second signals are outside of a predetermined range from the stored values, whereby a maintenance inspection of the crossing light can be initiated; and f) wherein the predetermined stored values include a reference orientation value of the crossing light, wherein the reference orientation value is established by an initial one of the second signals which is transmitted immediately after establishing a desired orientation of the crossing light through use of a peep sight.

12. The method of claim 11, wherein the first signal is generated by a semiconductor photodetector and the second signal is generated by a 3-axis magnetic sensor.

* * * * *